United States Patent [19]

Renfrow

[11] Patent Number: 4,790,936

[45] Date of Patent: Dec. 13, 1988

[54] COLLAPSABLE OIL SPILLAGE RECOVERY SYSTEM

[76] Inventor: John L. Renfrow, 1236 E. Alexander, Lafayette, La. 70501

[21] Appl. No.: 90,423

[22] Filed: Aug. 26, 1987

Related U.S. Application Data

[62] Division of Ser. No. 846,231, Mar. 31, 1986, Pat. No. 4,702,832.

[51] Int. Cl.⁴ .............................................. B01D 21/00
[52] U.S. Cl. .................................. 210/242.3; 405/60; 405/68; 405/210
[58] Field of Search ............... 166/205, 267, 357, 364; 210/776, 923, 342.3; 405/60, 63, 64, 68, 209, 210

[56] References Cited

U.S. PATENT DOCUMENTS

| | | | |
|---|---|---|---|
| 3,500,841 | 3/1970 | Logan | 210/923 |
| 3,724,662 | 4/1973 | Oritz | 210/243.3 |
| 4,324,505 | 4/1982 | Hammett | 405/60 |
| 4,388,188 | 6/1983 | Morris | 210/242.3 |
| 4,531,860 | 7/1985 | Barnett | 210/923 |

FOREIGN PATENT DOCUMENTS

| | | | |
|---|---|---|---|
| 1544710 | 4/1979 | United Kingdom | 405/60 |
| 2063776 | 6/1981 | United Kingdom | 405/60 |

*Primary Examiner*—Charles Hart
*Attorney, Agent, or Firm*—Pravel, Gambrell, Hewitt, Kimball & Krieger

[57] ABSTRACT

A system for collecting an oil slick from the surface of a body of water, pumping the confined and concentrated oil to an oil/water separator balloon partially submerged in the body of water, and subsequently transporting the separated oil into a third storage barge for reuse or transport. The collection portion further includes at least a pair of floatable arm members for directing oil to an oil collection means. The oil collection means further includes a pump means for pumping the oil/water layer through a line to the partially submerged oil/water separator means. The oil/water separator portion further includes a substantially inflated balloon having an upper oil/water space containing portion, and a lower oil receiving portion from the collector apparatus.

2 Claims, 5 Drawing Sheets

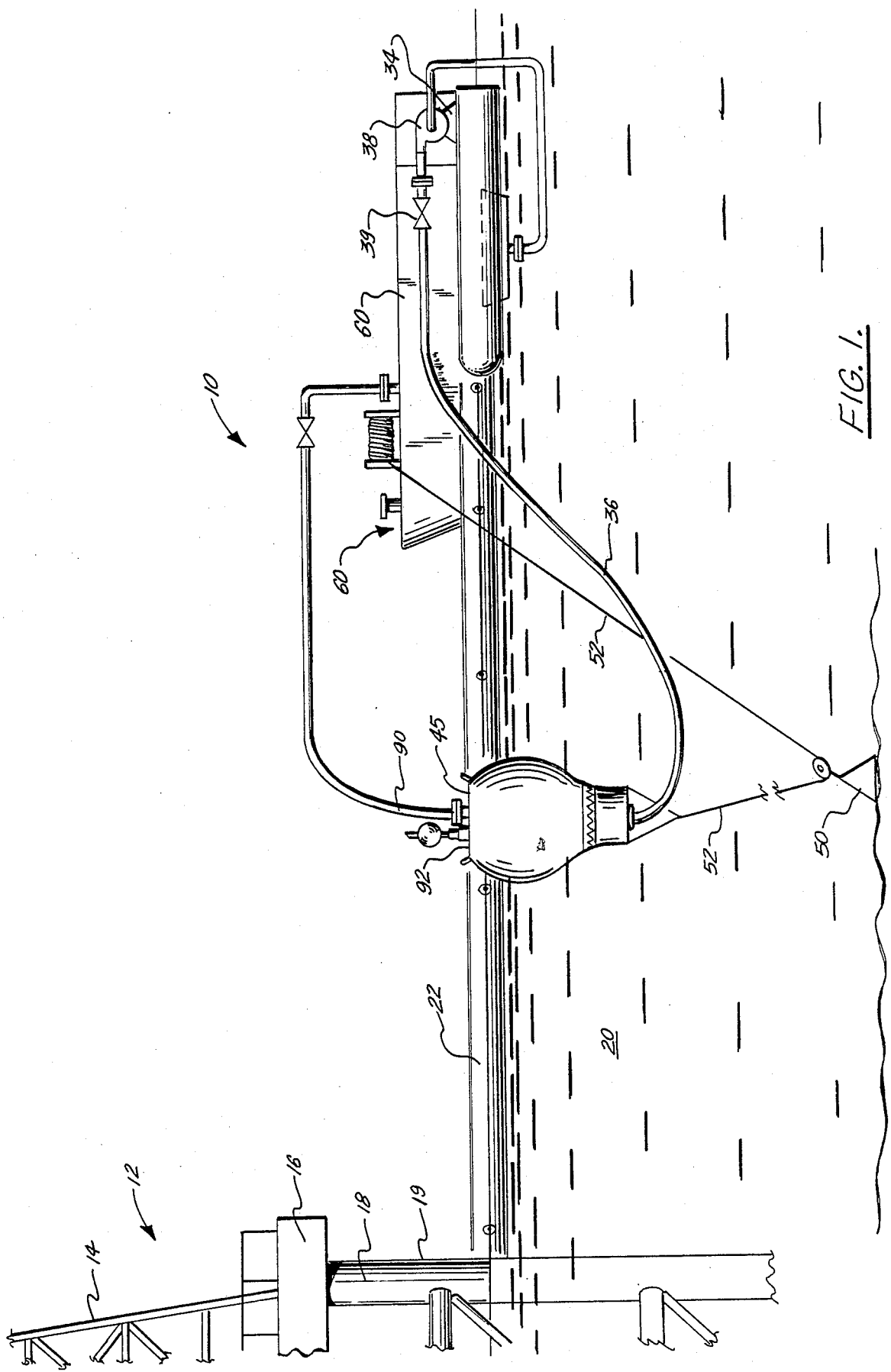

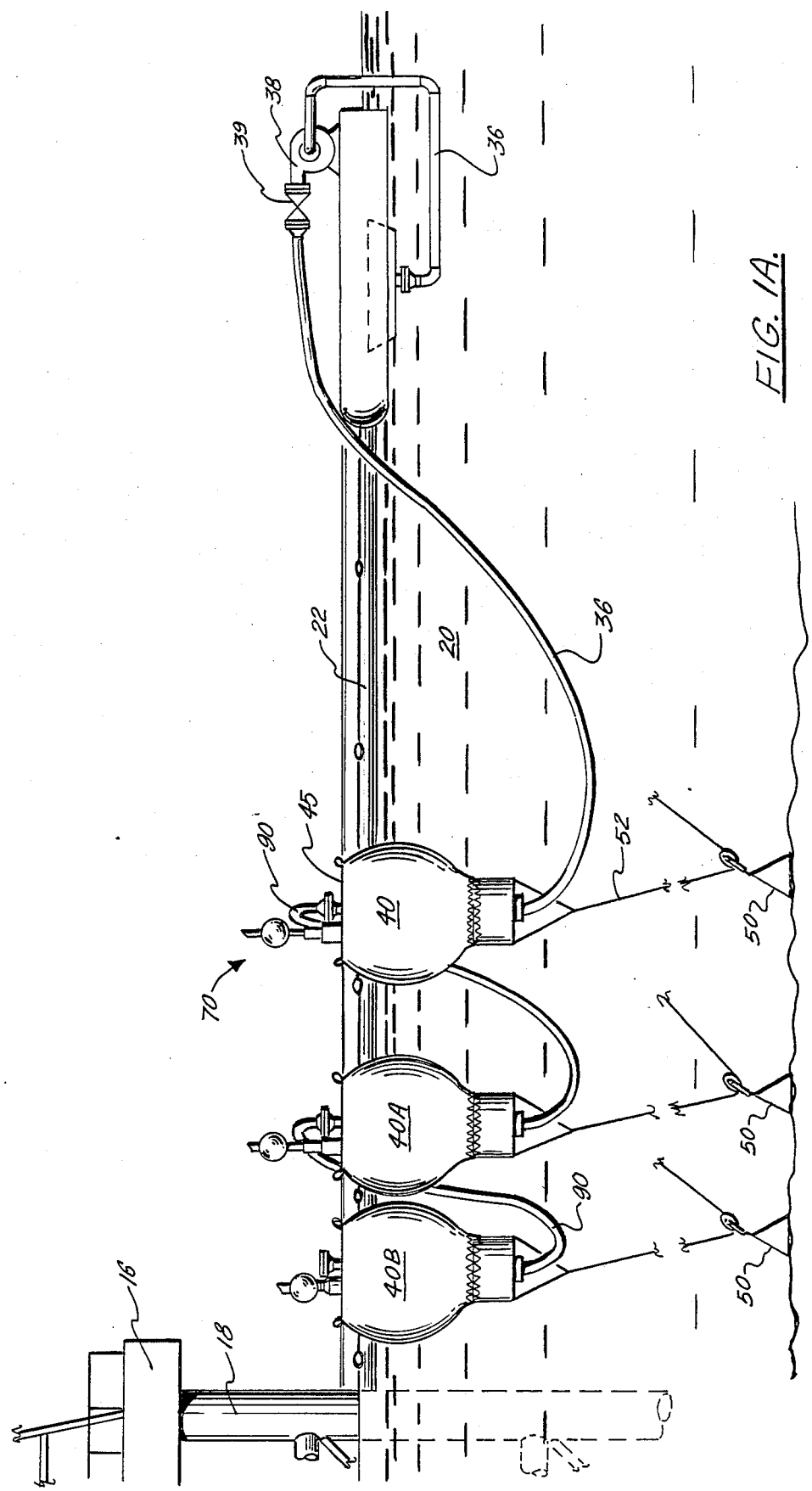

COLLAPSABLE OIL SPILLAGE RECOVERY SYSTEM

This is a division of co-pending application Ser. No. 846,231, filed on 3/31/86, U.S. Pat. No. 4,702,832.

BACKGROUND OF THE INVENTION

1. Field of the Invention

The system of the present invention relates to recovery of oil spills. More particularly, the present invention relates to a system for collecting oil spills upon a body of water, transporting the collected oil to a water, oil seperator balloon, subsequently pumping the seperated oil into a barge or the like vehicle for transporting away from the cite.

2. General Background of the Invention

The drilling and processing of hydrocarbons, particularly crude oil, is crucial in the maintenance of modern day society. A great deal of the oil that is drilled, and collected for refining is obtained from the earth line beneath great bodies of water such as and for example, the Gulf of Mexico. However, one of the most troublesome and difficult problems that is encountered in offshore drilling and production, is the ever-looming possibility of an oil spill. When this occurs, either through a blow-out or a rupture in the gas line, of an oil transport line, or some other catastrophic occurance on an oil rig, the crude oil spills out onto the surface of the water, and currents may carry it for literally thousands of miles where it may be ultimately washed up upon a beach ruining the use of the beach and endangering vast species of wildlife.

Therefore, there have been numerous efforts by mankind to devise methods and systems for either preventing oil spills, which have been for the most part unsuccessful, or for containing and collecting the oil spilled from an oil spill, which have met with some success. However, for the most part, the successes have been limited due to the fact that often times the materials and components of the system must be transported from land onto the cite of the rig, set up into place, and begin functioning sometimes many hours after the spill has occurred or been detected.

Several patents have issued which are pertinent to the present invention, the most important being as follows:

U.S. Pat. No. 4,038,182 issued to Jenkins entitled "Oil Spill Recovery Method And Apparatus", teaches the use of a method apparatus for recovering oil so that the surface of a body of water by forming a vortex and water mass for attracting only the oily film substance with the vortex flowed to a quiescent zone to enable seperation of the oily film substance in the water.

U.S. Pat. No. 3,800,951 issued to Mourlon, entitled "Apparatus For Removing A Substance Floating As A Layer On The Surface Of A Body Of Water", discloses an apparatus for removing an immiscible substance such as oil over-floating the body of water as a layer, the apparatus which generally comprises a means for locally whirling the liquid in the vicinity of the surface to generate a whirlpool into which the immiscible over-floating substance is centripetally drawn and a second means for extracting the oil from the depression accumulating, as it is circulated.

U.S. Pat. No. 4,356,086 issued to Oberg, entitled "Apparatus For Recovering Oil Or The Like Floating On A Liquid Surface Such As Water", discloses a container like structure floating on the water with a closable inlet for water and oil located in the water surface level. In the bottom of the container there is provided a downwardly projecting tube ending into the water and pumping water in and out of the structure. When the water is being pumped out, the oil is collected in the container space and the subsequent pumping in of the water the oil is pressed out through the outlet pipe for collecting in a vessel.

U.S. Pat. No. 4,196,087, issued to Gordon, entitled "Foating Surface Liquids Retrieval System", discloses a floating retriever for retrieving oil wherein there is included a central liquid collection chamber with a vacuum or suction pick-up to a mother vessel as the large circular flow intake ports with V shape lateral screws to bring the retrieved liquid to the collection chamber drawing the oil to the intake ports.

U.S. Pat. No. 4,485,013, issued to Cockman, entitled "Liquid Separator And Purification System", teaches the use of a system floated upon a body of water having a liquid collection section for collecting of water to a floating purification unit. That unit including at least one aeration tower having a dispersing nozzle. The liquid is collected on the towers and trickled down to move the filter beds which allow the water to pass through and back into the body of water. The rotating belts are cleaned at one end to remove the collective pollutants into a collection container.

U.S. Pat. No. 3,788,079, issued to Kirk, entitled "Method And Apparatus For Collecting A Floating Liquid", teaches the use of an apparatus for collecting an oil spill under a sheet with weighted periphery. The sheet is deployed by spreading it horizontally over the liquid surface confining it and centrally concentrating the liquid. The sheet retains the liquid for subsequent pumping into a vessel.

U.S. Pat. No. 4,449,850, issued to Cessou, entitled "Antipollution Device For Recovering Fluids Lighter Than Water Escaping From An Underwater Source", comprises a collector element which caps the source of escaping fluids. At least the lower part of the collected element is foldable and its wall comprises a permeable lower portion to facilitate positioning of the element over the source of polluting fluid.

U.S. Pat. No. 4,146,482, issued to Shyu, entitled "System For Collecting Oil", relates to an apparatus for collecting oil floating on a sea surface, having a collecting panel and tube with the force of waves pushing oil mixed with water and dirt causing the oil to flow into the panel and tube automatically. The tube would lead the oil to a container under sea level wherein the water and oil can be seperated and filtered and the pure oil is then pumped to a nearby ship for storage.

U.S. Pat. No. 3,724,662, issued to Ortiz, entitled "Control Of Oil Pollution At Sea, Apparatus And Method", relates to an apparatus for containing massive oil spills from tankers, off shore wells or small spills by confining the oil right at a spill source before it becomes a slick, having a marine pollution control system including a hugh plastic bag for which oil is pumped from the bag to a receiving facility. The system is a preventive and contingency constituting a complete, self-contained, light and mobile system.

SUMMARY OF THE PRESENT INVENTION

The perferred embodiment of the system of the present invention relates to a system for collecting an oil slick from the surface of a body of water, pumping the confined and concentrated oil to an oil/water separator balloon partially submerged in the body of water, and subsequently transporting the seperated oil into a third storage barge for reuse of transport. The collection portion further includes at least a pair of floatable arm members for directing oil to an oil collection means. The oil collection means further includes a pump means for pumping the oil/water layer through a line to the partially submerged oil/water seperator means. The oil/water seperator portion further includes a substantially inflated balloon having an upper oil/water space containing portion, and a lower oil receiving portion from the collector apparatus. The oil and water is percolated up through the balloon, with the lighter than water oil forming a seperate upper layer in the balloon, forcing the displaced water out of the bottom of the balloon. Following the accumulation of the oil in the balloon, the oil is subsequently pumped from the second portion of the balloon into a standing barge for storage or transport away from the spill cite. The overall system can be easily put into place with the oil seperator balloon and oil collector portion being able to be stored on board the rig or the like during none use.

An alterative embodiment would address the problem of a pipe line rupture beneath the surface of the water. The oil collector transport line would be adapted with a pipe fixture for enclosing around the rupture in the pipe so that the oil under pressure is percolated up through the holes into the oil water seperator portion, again with the oil collected in that portion to be pumped into a storage barge. When the oil pipe line has been shut down, and the oil is no longer under pressure, perferably there would be provided a "pig" run through the line to push any remaining oil out of the rupture in the line and into the transport line for subsequent removal through the oil/water seperator portion.

Therefore, it is a primary object of the present invention to provide a system for collecting oil containing water on the surface of a body of water after an oil spill has occurred;

Subsequently seperating the oil layer from the water layer in a second container portion, and thirdly, moving or transporting the oil seperated into a storage barge or the like container.

It is a further object of the present invention to provide a system whereby an oil slick can be moved into a portion of the system for seperating the oil and water, the lighter than water oil displacing water contained in the oil seperator, for removal therefrom.

It is still a further object of the present invention to provide an oil slick collecting system which is easily transportable, and can be stored on the rig or the like during none use.

It is still a further object of the present invention to provide an oil slick collector system which utilized in an efficent manner for collecting the oil in the slick and transporting it in a barge, whereby the purity of the oil could result in it being utilized as crude oil following collection.

BRIEF DESCRIPTION OF THE DRAWINGS

FIG. 1 is an overall view of the perferred embodiment of the system of the present invention;

FIG. 1A is an overall view of the perferred embodiment of the system of the present invention illustrating multiple oil collection balloons in place;

DETAILED DESCRIPTION OF THE PERFERRED EMBODIMENT

Figure 2:
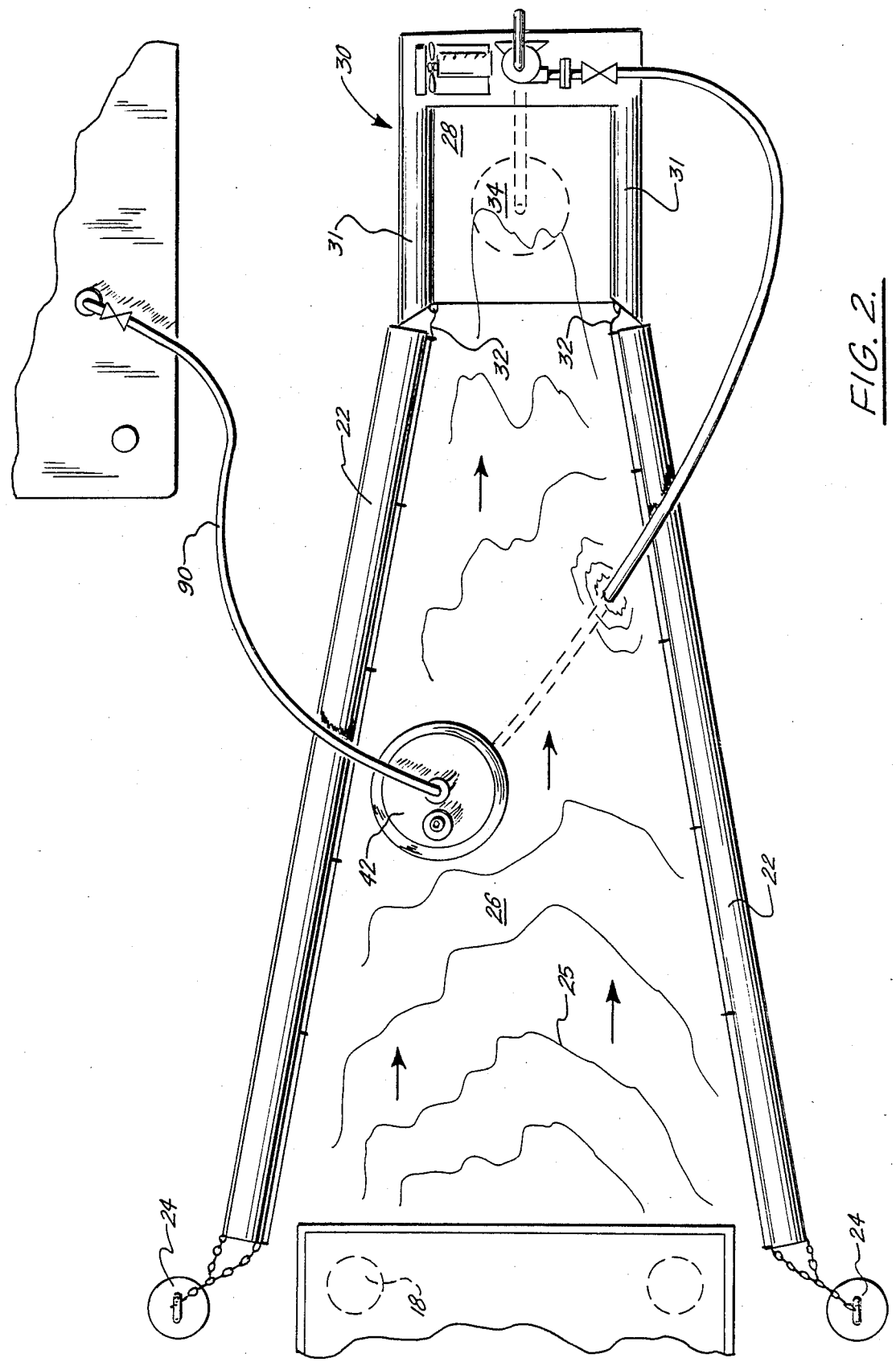
FIG. 2 is an upper view of the oil spill collection portion of the system of the present invention.
Figure 3:
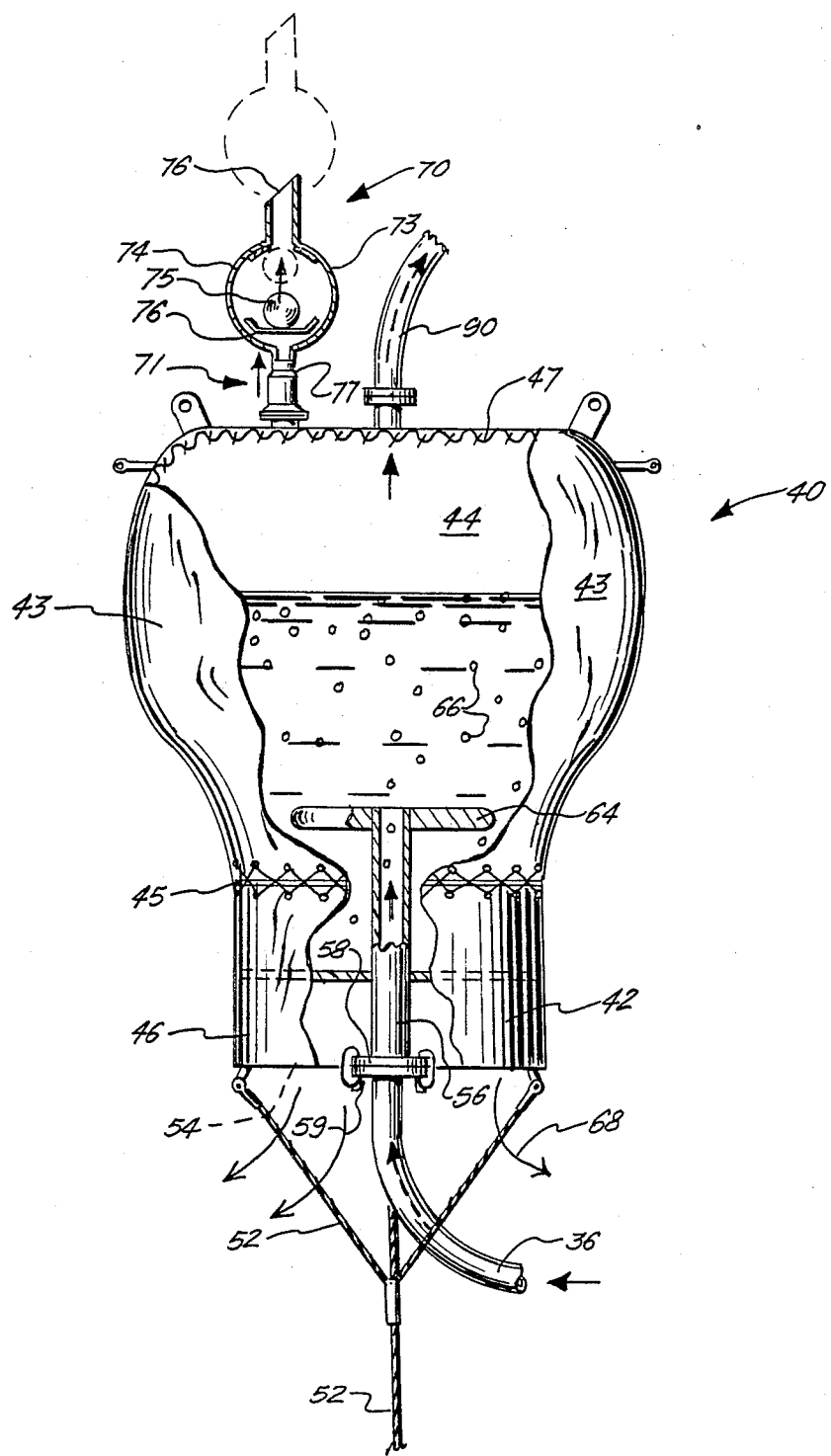
FIG. 3 is a side partial cut-away view of the oil/water seperator portion of the system of the present invention.

FIGS. 1-3 represent the perferred embodiment of the system of the present invention designated by the numeral 10. Turning now to FIG. 1, system 10 is illustrated in place in working condition, during an oil spill that has occured. As seen in the Figure, there is illustrated an oil production or drilling rig 12 which comprises a super structure 14, a rig platform portion 16, wherein the work on the rig is performed, the rig platform and super structure being held in position via a plurality of rig legs 18 which are primarily piling set in jacket legs 19 and embedded into the bottom of the body of water 20, which for purposes of this invention may be the Gulf of Mexico or the like.

As seen in the Figure, the collection system 10 has been moved into position adjacent rig 12 which, turning to FIG. 2 would include a pair of extender floatable arm members 22 anchored on their first ends via anchoring members 24 and held in position so that an oil spill which is designated by wavey lines 25 which may emanate from the platform 16 is moving out into an oil collection zone 26 defined by the space intermediate arms 22, oil rig platform 16 and the second end portion of oil collection means 21. As seen in top view in FIG. 2, oil spill 25 is being directed towards an oil collection area 28, which is defined by a generally open ended rectangular collection apparatus 30 having first and second horizontally disposed members 31 attached to floatable arm members 22 via lines 32 so that the oil spill 25 is confined within extended arms 22 and directed back towards space 28 of collection apparatus 30. Oil spill 25 is concentrated into space 28 and oil collection suction member 34, which is defined generally in phamton view in FIG. 2 and seen in side view in FIG. 1. Any oil contained within space 28 is suctioned into the body portion 34 through oil collection line 36 hence through pump 38 to be further transported into oil/water seperator means 40, as will be discussed further.

Within line 36 is further contained valve 39 for shutting any flow of oil at a desired time during the utilization of the system.

As seen further in FIGS. 2 and 3, transport line 36, on the furthest side of valve 39, is transporting oil contained from oil slick 25 via suction unit 34. The oil sucked therein also contains water. This water laden oil is transported through line 36 into oil/water seperator means 40.

Turning now to FIG. 3, oil collection means 40 comprises generally a flexible inflatable upper balloon portion 42 having a continuous side wall portion 43, the side wall portion defining an oil/water container space 44 therewithin. The lower portion of the balloon 42 is attached via a flexible connector such as webbing of rope 45 onto the lower sleeve portion 46. The sleeve portion 46 is a non-flexible annular collar type member which gives the balloon 40 weight for allowing it to be further submerged down into the water 20 as seen in FIG. 1. Generally, in the overall perferred use of the apparatus, the balloon 40 would for the most part be submerged in the water except for the upper portion 45, which would normally be outside of the body of water, in its perferred use. As seen in top view in FIG. 2, in this particular instance, balloon 42 is contained within the flow space 26 as defined by arm members 22 during use of the system. Therefore, the system is confined truly to the area that the spill is concentrated therein.

Returning now back to the structure and functioning of seperator means 40, as seen in FIG. 1, the seperator means 40 would be anchored to be submerged to its proper depth via the anchoring member 50 which could be a block of concrete or the like, having an anchoring line 52 extending from the lower portion of balloon 40 with the pair of anchoring members 54 connected to collar member 46 during use. The line 52 would be on its second end connected to collector barge 60 the function of which will be discussed further. As seen in the Figure, the line 52 would be directed to a type of spool 62 so that the line could be lead out or pulled in as the need is to submerge or be submerged balloon 40 during use of the system.

As seen in FIG. 3, the line 36 which is transporting the water ladened oil, is transporting the oil into the bottom area 54 of balloon 40, coupled to a nozzle float member 56 which comprises a bottom collar member 58 connectable to second collar member 59 of line 36 for defining a continuous flow line into the confined area 44 of balloon 42. Nozzle member 56 further includes an upper phlange portion 64 which acts as a float or the like in the water and oil contained within the confines of balloon 44. It should be noted for purposes of structure, that balloon 42 is open ended at point 54 so that as oil slick is moved through line 36 into space 44, and the oil 66, as depicted by droplet 66 within balloon 42, is percolated to the top portion of the balloon, the oil, being lighter than water would displace the water in the upper portion in space 44 of balloon 42 with the displaced water being forced out of the bottom portion 54 as indicated by arrows 68.

Therefore, in the perferred embodiment, space 44 for the most part would have a pure oil layer in its top portion with the oil/water interface being contained within space 44 and the water below the layer of oil.

There is further provided a gas release means 70 which includes a ball valve member 72 contained within a housing 74 having an outlet 76 for release of any gas which may be trapped within space 44. It should be noted that gas release means 70 further includes a telescopic flow housing 77 which enables the housing 74 to be projected upwardly away from oil collection balloon 40, as seen in FIG. 1A, so that the pressure exerted by the oil collection within balloon 40 is allowed to flow up housing 71 so as to not to prevent blockage of flow into balloon 40 due to the pressure exerted. Of course, as further seen in FIG. 1A, when the balloon is not in the collecting mode, the telescopic portion 71 can be lowered in the position as seen in the furthest left collection balloon 40A in FIG. 1A. In the perferred embodiment, the gas would flow around plate member 73 out of outlet 76 into atmosphere. In the event oil would attempt to force its way by, ball 75 would flow upward and would block port 76 thus not allowing any oil flow to move out of gas release means 70.

Following the accumulation of oil 66 within space 44, there is seen in the Figures an oil transport line 90 which extends from upper portion 92 of balloon 42 and leads into a collector barge 60 as seen in FIG. 2. Following the accumulation of oil 66 into upper portion 44, a pump member is activated which would in effect suck the oil collected in space 44 through line 90 to be collected as pure crude oil in barge 60. Of course, barge 60 could either act as an transport barge or simily a storage barge. Idealy, with the system functioning as planned, the oil collected in barge 60 would be pure crude oil, since the water contained in the oil would have been seperated out as a heaver liquid during collection.

It is forseen that balloon 42 would be a collapsable balloon when not in use, and could be easily stored within the confindes of platform 16. Likewise, the transport lines and the oil collection system could also be easily maintained within the confindes of the platform, so that if in fact a rupture or a spill did occur, the system could be placed in use very quickly. Also, in the event of major spills, there could be a plurality of collection systems and oil/water seperator baloons for a greater volume of collection being undertaken.

Reference is made to FIG. 1A, which includes the primary oil collection means 40 as seen in FIG. 1. However, FIG. 1A exemplifies the use of a plurality of oil collection means 40, i.e., 40A and 40B, which would enable the flow of oil collected from balloon 40, for example, rather than flowing or being pumped into barge 60, line 90 exiting balloon 40 from its top portion 45, would lead into a second balloon 48 having identical structure to balloon 40 for percolating oil therethrough and for collection in the top portion of balloon 40A, which likewise when became filled, would flow through a subsequent line into a third balloon 40B at which time, although not shown in FIG. 1A, a line 90 would then proceed to flow into collection barge 60 as seen in FIG. 1. For purposes of illustration, only three (3) balloons are shown, but depending on the magnitude of the spill, there could be an unlimited number of balloons for storing the oil in place should there be no collection barge available or should the barge filled with oil so that the oil would have to be stored in the collection means 40 in the interium period. Likewise, as seen in FIG. 1A, each balloon would be anchored onto the bottom of the ocean via anchored means 50, and would be maintained in position as such.

Figure 4:
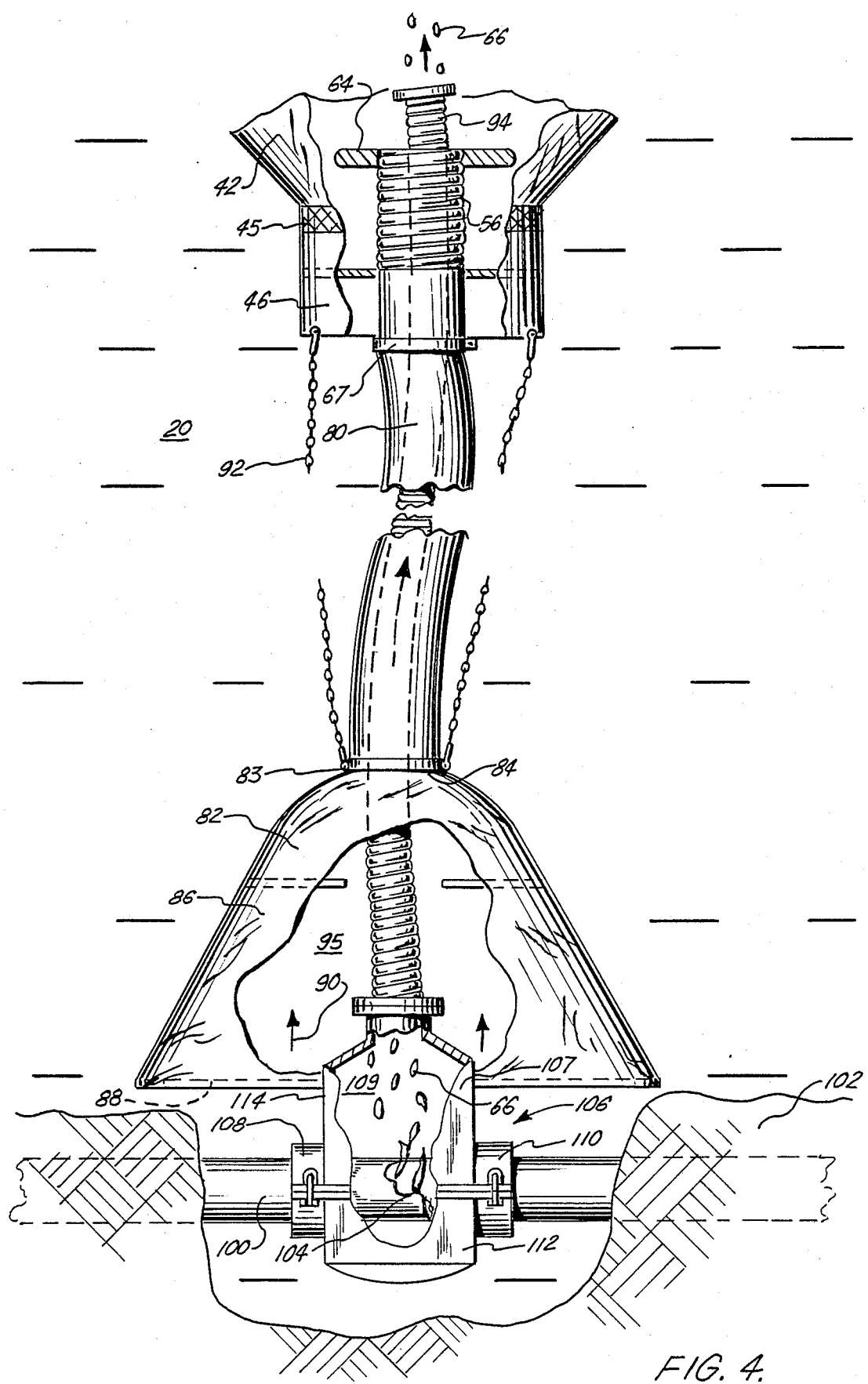
FIG. 4 is an overall view of the system of the present invention utilized in collecting an oil spill from a ruptured line or the like beneath the surface of the water.

FIG. 4 represents an additional use of the preferred embodiment of the apparatus of the present invention slightly modified for that particular use. In FIG. 4, there is depicted an oil or gas flow line 100 which for the most part will be buried within the sea bottom 102 during use. However, for purposes of the use of the invention, we are assuming a rupture 104 has occured within line 100, wherein oil or gas is beginning to seap through the earth 102 and out into the open water 20. Therefore, there is a need to confine this leakage as much as possible.

As seen in FIG. 4, the apparatus for this particular use will be modified from the preferred embodiment in the following manner. The apparatus structurally still contains the upper collection balloon portion 42, which has a lower collar portion 46 mounted thereto, with an opening 54 through its bottom. Also, included nozzle float member 56, having upper flange portion 64 for opening into balloon 42. In this embodiment, nozzle portion 56 is connected onto a lower outer flexible casing 80, which is attached to the lower portion 67 of nozzle portion 56, and on its second end is attached to an annular hood 82 which comprises and upper open ended portion 84 attached to the lower end 83 of outer casing 80. Hood 82 has as continuous annular side wall 86 which flares outward to a broad base open base 88 for allowing fluid flow there into as seen by ARROWS 90. Hood 82 is also attached to upper oil containing means 42 via a pair of chains 92 inter connected between collar 46 and the lower attachment ring 83 of holes 80.

Extending throughout the length of housing 80 and projecting out through annular collar 64 is internal oil/gas collecting hose 94 which is substantially lesser diameter hole than outer casing 80, and extends downward into the confines 95 of hood 82. Hose 94 is rigidly attached to a means 106 for collecting the oil from rupture 104, the means as will be discussed further. Means 106 comprising a container portion 107 which comprises an upper container portion 114 and a lower container portion 112, each of the container portions 114 and 112 hingedly attached so as to be secured around pipe 100 as seen in FIG. 4. The container portion 107 has a first and second clamps 108 and 110 respectively on either side, for attachment to the pipe so that when once attached the inner space 109 of container 107 is directly above the rupture 104. Therefore, any oil which is leaking from rupture 104 following the attachment of container 107 would move upward as depicted by droplings 66 through internal pipe 94 and up into the space of balloon 42 for seperating between the oil and water.

For purposes of explanation, hood 82 and annular flexible casing 80 have a crucial function in this embodiment. While container 107 is being placed around pipe 100, prior to being clamped securly in place, leakage from rupture 104 is continuing to go out into the water. Therefore, the movement of hood 82 into position as seen in FIG. 4, will substantially clutch oil that will escape into the water prior to the securing of container 107 upon rupture 104. Of course, any oil which is contained into hood 82 will float upward through the annular spacing between the wall of casing 80 and the internal pipe 94, and will likewise flow out into the oil collection space within balloon 42 as seen in the Figure. Therefore, in this embodiment, it is forseen that a ruptured pipe, can be secured rather easily so that any oil flowing therefrom will be forced up into balloon 42.

It should be noted, however, that following a rupture on a line 100, normally the operators of the system would shut the flow of oil or gas within line 100 down. Therefore, any oil flowing from rupture 102 following the shut down would be very slight due to the fact that the oil is no longer flowing out of the rupture under pressure. However, there is still some contamination. Therefore, it is forseen that rather than allow this oil to trickle out slowly, one could place a "pig" into the pipe 100 and force the "pig" under pressure towards the rupture 104, thus forcing any oil which is left in pipe 100 after it has been shut down, to be removed therefrom via rupture 104 into oil collection balloon 42 for recapture.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A system for recovering oil from a break in an underwater pipeline, the system comprising:
   a. means for substantially enveloping portion of the pipe, that portion of the pipe from which oil is leaking;
   b. a transport line in fluid communication with said means for enveloping the flow of oil from the pipe line as it percolates through the water;
   c. means on the second end of the transport line for receiving the oil recovered in the pipe, the means including a partially submergable balloon, wherein the oil recovered is percolated through the water contained within the balloon and displaces the water from the balloon to form an upper layer of oil.

2. The system in claim 1, wherein the seperated oil is pumped from the upper portion of the storage balloon into a storage barge or the like.

* * * * *